(12) United States Patent
Higuchi et al.

(10) Patent No.: US 10,697,384 B2
(45) Date of Patent: Jun. 30, 2020

(54) CONTROL DEVICE AND CONTROL METHOD FOR ENGINE

(71) Applicant: TOYOTA JIDOSHA KABUSHIKI KAISHA, Toyota-shi, Aichi-ken (JP)

(72) Inventors: Akihiko Higuchi, Toyota (JP); Tomohiro Nakano, Toyota (JP); Eiji Murase, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/164,135

(22) Filed: May 25, 2016

(65) Prior Publication Data

US 2016/0348604 A1 Dec. 1, 2016

(30) Foreign Application Priority Data

May 29, 2015 (JP) .................. 2015-110329
May 19, 2016 (JP) .................. 2016-100731

(51) Int. Cl.
*F02D 41/02* (2006.01)
*F02D 41/30* (2006.01)
(Continued)

(52) U.S. Cl.
CPC ....... *F02D 41/024* (2013.01); *F02D 41/3023* (2013.01); *F02D 41/3094* (2013.01);
(Continued)

(58) Field of Classification Search
CPC .... F02D 41/402; F02D 41/403; F02D 41/405; F02D 41/024; F02D 41/3094;
(Continued)

(56) References Cited

U.S. PATENT DOCUMENTS 5,101,785 A * 4/1992 Ito .................. F02D 41/2416
123/299
5,479,775 A * 1/1996 Kraemer .................. F02B 3/12
60/274

(Continued)

FOREIGN PATENT DOCUMENTS

CN 101091051 A 12/2007
CN 101858267 A 10/2010
(Continued)

*Primary Examiner* — Mahmoud Gimie
*Assistant Examiner* — Joshua Campbell
(74) *Attorney, Agent, or Firm* — Oliff PLC

(57) ABSTRACT

During a catalyst rapid warm-up at a time of a cold start of an engine, a fuel is injected by a required injection quantity through a multi-stage injection consisting of a fuel injection by a full lift injection during an intake stroke and a fuel injection by a partial lift injection during a compression stroke. In a case where a deterioration of a combustion state is confirmed, a correction for increasing the required injection quantity, which is to enrich an air-fuel ratio, is performed. At a time of the enriching quantity increase, a sum of injection quantities of the multi-stage injection is increased by the amount of the correction for increasing the required injection quantity without the injection quantity and an injection timing of the fuel injection by the partial lift injection being changed from a base time.

8 Claims, 6 Drawing Sheets

(51) Int. Cl.
  *F02D 41/40* (2006.01)
  *F02D 41/38* (2006.01)
  *F02D 41/20* (2006.01)

(52) U.S. Cl.
  CPC ............ *F02D 41/402* (2013.01); *F02D 41/20* (2013.01); *F02D 41/3836* (2013.01); *F02D 41/403* (2013.01); *F02D 41/405* (2013.01); *F02D 2041/3881* (2013.01); *Y02T 10/26* (2013.01); *Y02T 10/44* (2013.01)

(58) Field of Classification Search
  CPC ......... F02D 41/3023; F02D 2041/3881; F02D 41/20; F02D 41/3836; Y02T 10/26; Y02T 10/44
  USPC ........................................................ 701/104
  See application file for complete search history.

(56) References Cited

U.S. PATENT DOCUMENTS

| | | | | |
|---|---|---|---|---|
| 6,021,754 | A * | 2/2000 | Kendrick | F02D 41/2467 123/339.19 |
| 6,073,606 | A * | 6/2000 | Shimizu | F02D 41/3064 123/295 |
| 6,505,594 | B1 * | 1/2003 | Katayama | F02D 31/002 123/179.18 |
| 2007/0068485 | A1 * | 3/2007 | Hilditch | F02D 41/0255 123/299 |
| 2011/0067679 | A1 * | 3/2011 | Hitomi | F02D 41/3035 123/564 |
| 2011/0197851 | A1 | 8/2011 | Parrish et al. | |
| 2013/0080039 | A1 * | 3/2013 | Nakamoto | F02D 41/009 701/113 |
| 2014/0311459 | A1 * | 10/2014 | Katsurahara | F02D 41/247 123/478 |
| 2015/0059686 | A1 * | 3/2015 | Glugla | F02M 21/0284 123/299 |
| 2015/0275801 | A1 | 10/2015 | Nagaoka et al. | |
| 2015/0377172 | A1 | 12/2015 | Higuchi et al. | |
| 2017/0175653 | A1 | 6/2017 | Uchida et al. | |

FOREIGN PATENT DOCUMENTS

| | | | |
|---|---|---|---|
| CN | 103946522 A | 7/2014 | |
| CN | 105298670 A | 2/2016 | |
| DE | 4332099 C2 * | 1/2003 | ............ F02D 41/08 |
| DE | 102007059535 A1 | 6/2009 | |
| DE | 102011010750 A1 | 3/2012 | |
| DE | 102012205839 A1 | 10/2013 | |
| EP | 2975248 A1 | 1/2016 | |
| JP | 58195069 A * | 11/1983 | ............ F02P 5/1521 |
| JP | 2007-239577 A | 9/2007 | |
| JP | 2011-099334 A | 5/2011 | |
| JP | 2011-106349 A | 6/2011 | |
| JP | 2012-012991 A | 1/2012 | |
| JP | WO 2013073111 A1 * | 5/2013 | ............ F02D 41/247 |
| JP | 2013181494 A * | 9/2013 | |
| JP | 2013181494 A * | 9/2013 | |
| WO | 2006/070259 A2 | 7/2006 | |
| WO | WO-2013073111 A1 * | 5/2013 | ............ F02D 41/30 |
| WO | 2014/057820 A1 | 4/2014 | |
| WO | 2015/036825 A1 | 3/2015 | |

\* cited by examiner she disclosure of Japanese Patent Application No. 2015-110329 filed on May 29, 2015 and the disclosure of Japanese Patent Application No. 2016-100731 filed on May 19, 2016 including the specifications, drawings and abstracts are incorporated herein by reference in its entirety.

CONTROL DEVICE AND CONTROL METHOD FOR ENGINE

INCORPORATION BY REFERENCE

The disclosure of Japanese Patent Application No. 2015-110329 filed on May 29, 2015 and the disclosure of Japanese Patent Application No. 2016-100731 filed on May 19, 2016 including the specifications, drawings and abstracts are incorporated herein by reference in its entirety.

BACKGROUND OF THE INVENTION

1. Field of the Invention

The invention relates to a control device and a control method for an engine.

2. Description of Related Art

An electromagnetic fuel injection valve that is disposed in an engine such as an automotive engine is provided with an electromagnetic solenoid and a valve body, and the valve body is opened in response to energization of the electromagnetic solenoid. The electromagnetic fuel injection valve is configured to be capable of adjusting an injection quantity by an energization time of the electromagnetic solenoid being changed. The valve body of the fuel injection valve is subjected to a bounce motion immediately after reaching a fully open position due to a reaction to a collision at a time of arrival at the fully open position. This bounce motion of the valve body results in a variation of the injection quantity of the fuel injection valve. When injection is completed before the valve body reaches the fully open position, the fuel injection is performed without being affected by the bounce motion of the valve body. In this regard, a partial lift injection technique for realizing a small-quantity injection with a high level of accuracy by performing the fuel injection with an energization time set to a length of time that is shorter than a length of time required for the valve body to reach the fully open position, which is a so-called partial lift injection, is known.

The energization time of the fuel injection valve is set based on a required injection quantity that is calculated by a base value which is set in accordance with an engine rotation speed and an engine load being corrected if necessary and the pressure of a fuel that is supplied to the fuel injection valve (fuel pressure). Japanese Patent Application Publication No. 2011-106349 (JP 2011-106349 A) discloses a technique that allows the required injection quantity to be subjected to an amount-increasing correction in accordance with a decline in the engine rotation speed at a time of an idle operation of the engine.

SUMMARY OF THE INVENTION

The injection of a small amount of the fuel that is realized by the partial lift injection described above is employed in a situation in which a precise injection control is required. In this situation, slight changes in the injection quantity and an injection timing significantly affect combustion in the engine and an exhaust gas property. In a case where the injection quantity of the partial lift injection is increased, in particular, a penetration force of fuel spray increases, and then a fuel concentration distribution of an air-fuel mixture formed in a cylinder changes or a piston top surface and a cylinder wall surface are subjected to an increase in fuel adhesion with the spray having an extended reach. Accordingly, the combustion and the exhaust gas property deteriorate in some cases once the required injection quantity is subjected to the amount-increasing correction when the fuel injection by the partial lift injection is carried out.

The invention provides a control device and a control method for an engine that allow a fuel injection by a partial lift injection to be performed in an appropriate manner.

A first aspect of the invention provides a control device for an engine. The engine includes a fuel injection valve and the fuel injection valve has a valve body. The control device includes an electronic control unit. The electronic control unit is configured to: calculate a required injection quantity in accordance with an operation state of the engine; control the fuel injection valve such that a fuel is injected by the required injection quantity; and increase a sum of injection quantities of a multi-stage injection by an amount of an injection quantity increase due to an amount-increasing correction with the injection quantity and an injection timing of a partial lift injection maintained, when the fuel is injected by the required injection quantity by the multi-stage injection and the required injection quantity is subjected to the amount-increasing correction, the multi-stage injection including the partial lift injection, and the partial lift injection being a fuel injection terminated before the valve body reaches a fully open position.

According to the engine control device, the fuel injection by the partial lift injection in which changes in the injection quantity and the injection timing significantly affect combustion in the engine and an exhaust gas property is performed at an injection quantity and an injection timing set from the beginning even in a case where the amount-increasing correction is performed on the required injection quantity while the multi-stage injection including the fuel injection by the partial lift injection is carried out. Accordingly, the fuel injection by the partial lift injection can be performed in an appropriate manner.

In the control device, the electronic control unit may be configured to increase the injection quantity of a fuel injection in the multi-stage injection other than the partial lift injection such that the sum of the injection quantities of the multi-stage injection is increased by the amount of the injection quantity increase due to the amount-increasing correction. In the control device, the electronic control unit may be configured to increase the number of the partial lift injections in the multi-stage injection such that the sum of the injection quantities of the multi-stage injection is increased by the amount of the injection quantity increase due to the amount-increasing correction.

In the control device, the electronic control unit may be configured to perform the multi-stage injection during an idle operation during a cold start of the engine, and the multi-stage injection may include a fuel injection during an intake stroke by a full lift injection and a fuel injection during a compression stroke by the partial lift injection, the full lift injection is an injection terminated after the valve body has reached the fully open position. The fuel injection during the compression stroke by the partial lift injection in this case is performed so that a fuel concentration in the vicinity of an ignition plug is locally raised. When the injection quantity and the injection timing of the fuel injection change, the injected fuel cannot be collected in the vicinity of the ignition plug or a cylinder wall surface and a piston top surface are subjected to an increase in fuel adhesion, which results in a deterioration of the combustion. In this point, in the engine control device described above, the injection quantity and the injection timing of the fuel injection during the compression stroke by the partial lift injection do not change even in a case where the required injection quantity is corrected to be increased, and thus the deterioration of the combustion is avoided. In the control device, the electronic control unit may be configured to perform the amount-increasing correction on the required injection quantity when a deterioration of a combustion state of the engine is confirmed. According to the configuration described above, the amount-increasing correction is performed when the deterioration of the combustion state is confirmed as an example of the correction for increasing the required injection quantity that is performed while the above-described multi-stage injection at a time of the idle operation of the engine during a catalyst warm-up is carried out.

A second aspect of the invention provides a control method for an engine. The engine includes a fuel injection valve and the fuel injection valve having a valve body. The control method includes: calculating a required injection quantity in accordance with an operation state of the engine; controlling the fuel injection valve such that a fuel is injected by the required injection quantity; and increasing a sum of injection quantities of a multi-stage injection by an amount of an injection quantity increase due to an amount-increasing correction with the injection quantity and an injection timing of a partial lift injection maintained, when the fuel is injected by the required injection quantity by the multi-stage injection and the required injection quantity is subjected to the amount-increasing correction, the multi-stage injection including the partial lift injection, and the partial lift injection being a fuel injection terminated before the valve body reaches a fully open position.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
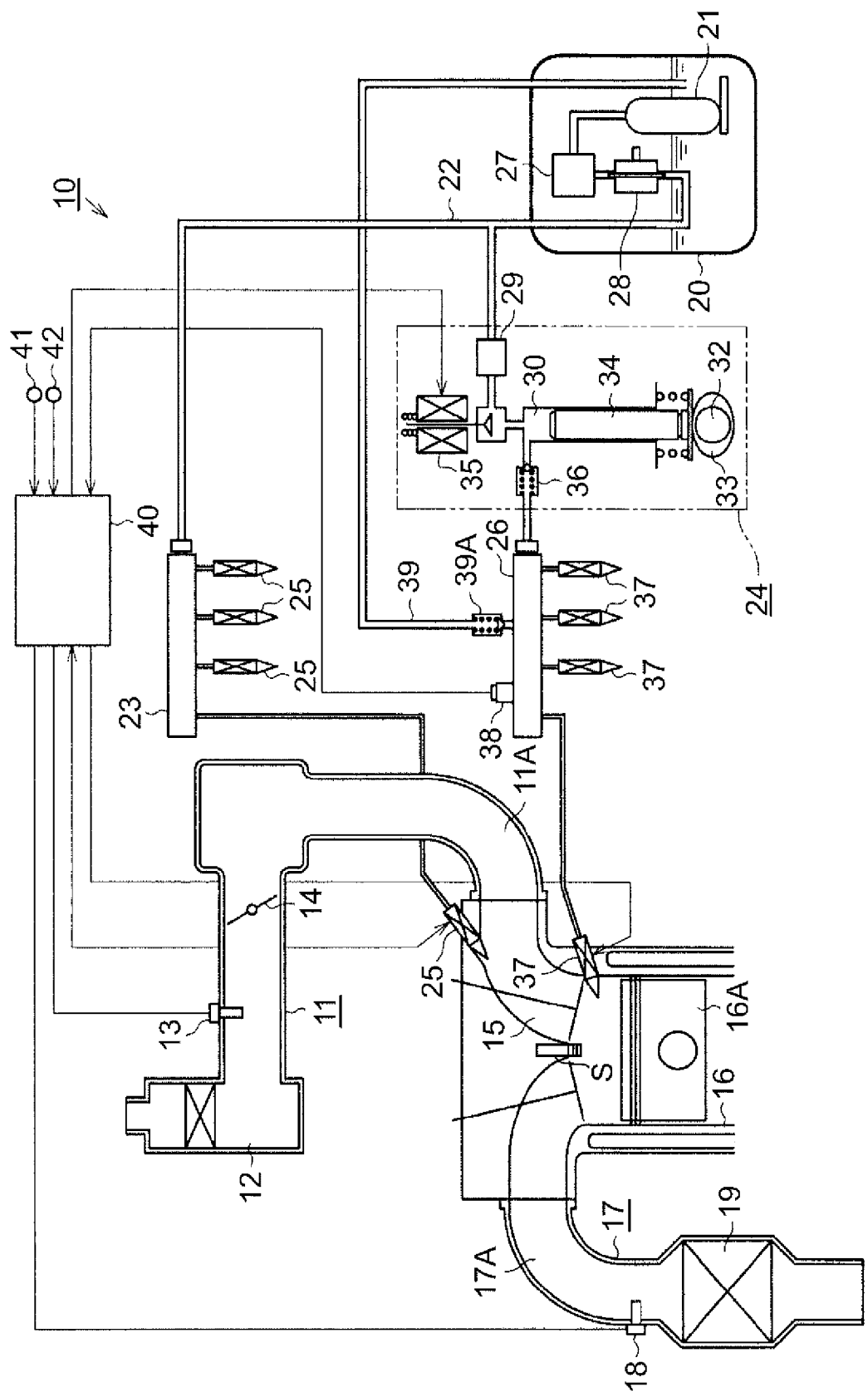
FIG. 1 is a schematic drawing illustrating a configuration of a fuel system of an engine to which a first embodiment of an engine control device is applied.

Hereinafter, a first embodiment of an engine control device will be described in detail with reference to FIGS. 1 to 7. In an intake passage 11 of an engine 10 to which the control device according to this embodiment is applied, an air cleaner 12, an air flow meter 13, a throttle valve 14, and an intake manifold 11A are disposed in order from the upstream side of the intake passage 11 as illustrated in FIG. 1. The air cleaner 12 filters dust or the like in intake air flowing into the intake passage 11. The air flow meter 13 detects the flow rate of the intake air (suctioned air amount GA). The throttle valve 14 adjusts the suctioned air amount through a change in a valve opening degree of the throttle valve 14. The intake passage 11 branches at the intake manifold 11A and then is connected to respective cylinders 16 through intake ports 15 of the respective cylinders 16.

A piston 16A is arranged to be capable of reciprocating in each of the cylinders 16 of the engine 10. An ignition plug S, which ignites an air-fuel mixture by spark discharge, is disposed in each of the cylinders 16 (refer to FIG. 6 and FIG. 7).

In an exhaust passage 17 of the engine 10, an exhaust manifold 17A, an air-fuel ratio sensor 18, and a catalyst device 19 are disposed in order from the upstream side of the exhaust passage 17. Exhaust gases discharged from the respective cylinders 16 to the exhaust passage 17 merge with each other in the exhaust manifold 17A, flow into the catalyst device 19, and are purified in the catalyst device 19. The air-fuel ratio sensor 18 outputs a signal in accordance with an air-fuel ratio at a time of combustion of the exhaust gas flowing into the catalyst device 19.

A fuel supply system of the engine 10 is provided with a feed pump 21 that pumps out and discharges a fuel in a fuel tank 20. The feed pump 21 is connected to each of a low-pressure fuel pipe 23 and a high-pressure fuel pump 24 via a low-pressure fuel passage 22. The low-pressure fuel pipe 23 is a fuel container that stores the fuel which is sent from the feed pump 21. A port injection valve 25 of each of the cylinders 16 of the engine 10 is connected to the low-pressure fuel pipe 23. The port injection valve 25 is an electromagnetic fuel injection valve. The port injection valves 25 are configured to inject the fuel stored in the low-pressure fuel pipe 23 into the intake ports 15 of the engine 10 in response to energization. The high-pressure fuel pump 24 further pressurizes the fuel that is sent from the feed pump 21 and discharges the fuel to a high-pressure fuel pipe 26. A filter 27 and a pressure regulator 28 are disposed on the low-pressure fuel passage 22. The filter 27 filters the fuel that is discharged by the feed pump 21. When the pressure of the fuel in the low-pressure fuel passage 22 (feed pressure) exceeds a predetermined relief pressure, the pressure regulator 28 is opened for the fuel in the low-pressure fuel passage 22 to be subjected to a relief into the fuel tank 20.

Two volume portions, one being a fuel gallery 29 and the other being a pressurizing chamber 30, are disposed in the high-pressure fuel pump 24. The fuel that is sent from the feed pump 21 is introduced into the fuel gallery 29 through the low-pressure fuel passage 22. A pulsation damper for damping a pulsation of the fuel pressure is disposed in the fuel gallery 29. A plunger 34 is disposed in the high-pressure fuel pump 24. The plunger 34 is allowed to reciprocate by a pump-driving cam 33 disposed on a camshaft 32 of the engine 10 and changes the volume of the pressurizing chamber 30.

The fuel gallery 29 and the pressurizing chamber 30 are connected to each other via an electromagnetic spill valve 35. In this embodiment, the electromagnetic spill valve 35 is a normally open valve that is closed in response to energization. When the electromagnetic spill valve 35 is open, the electromagnetic spill valve 35 allows the fuel gallery 29 and the pressurizing chamber 30 to communicate with each other. When the electromagnetic spill valve 35 is closed, the electromagnetic spill valve 35 blocks the communication between the fuel gallery 29 and the pressurizing chamber 30. The pressurizing chamber 30 communicates with the high-pressure fuel pipe 26 via a check valve 36. When the pressure in the pressurizing chamber 30 becomes higher than the pressure in the high-pressure fuel pipe 26, the check valve 36 is opened so that the fuel is allowed to be discharged from the pressurizing chamber 30 to the high-pressure fuel pipe 26. When the pressure in the high-pressure fuel pipe 26 becomes higher than the pressure in the pressurizing chamber 30, the check valve 36 is closed so that a backflow of the fuel from the high-pressure fuel pipe 26 to the pressurizing chamber 30 is restricted.

The high-pressure fuel pipe 26 is a fuel container that stores the high-pressure fuel which is sent from the high-pressure fuel pump 24. In-cylinder injection valves 37 that are installed in the respective cylinders 16 of the engine 10 are connected to the high-pressure fuel pipe 26. The in-cylinder injection valves 37 are configured as electromagnetic fuel injection valves that inject the fuel stored in the high-pressure fuel pipe 26 into the cylinders 16 in response to energization. A fuel pressure sensor 38, which detects the fuel pressure in the high-pressure fuel pipe 26 (high pressure side fuel pressure), is attached to the high-pressure fuel pipe 26. A relief valve 39A is attached to the high-pressure fuel pipe 26. When the pressure in the high-pressure fuel pipe 26 excessively rises, the relief valve 39A is opened for the fuel in the high-pressure fuel pipe 26 to be subjected to a relief into the fuel tank 20 through a relief passage 39.

The fuel supply system of the engine 10 is provided with an electronic control unit 40. The electronic control unit 40 is provided with a central processing unit that performs various types of calculation processing, a read-only memory in which a program and data for the calculation processing are stored in advance, and a readable and writable memory that temporarily stores a result of the calculation by the central processing unit, results of detection by various sensors, and the like. The electronic control unit 40 is provided with a non-volatile memory for storing and keeping data even when power is turned off.

Detection signals of the air flow meter 13, the air-fuel ratio sensor 18, the fuel pressure sensor 38, a crank angle sensor 41, and an accelerator pedal sensor 42 are input to the electronic control unit 40. The crank angle sensor 41 detects a rotational phase of a crankshaft (crank angle) of the engine 10. The accelerator pedal sensor 42 detects an amount by which an accelerator pedal is depressed by a driver. The electronic control unit 40 performs an energization control on the electromagnetic spill valve 35 of the high-pressure fuel pump 24, the port injection valve 25, and the in-cylinder injection valve 37 based on results of the detection by these sensors. The electronic control unit 40 calculates and obtains an engine rotation speed NE from the result of the detection by the crank angle sensor 41 and calculates and obtains an engine load factor KL from the results of the detection by the air flow meter 13 and the accelerator pedal sensor 42. The engine load factor KL represents the ratio of a current cylinder inflow air quantity at a time when the maximum value of the cylinder inflow air quantity at the current engine rotation speed NE in natural aspiration is "100%". The engine load factor KL is used as an engine load index value.

A fuel pressure control according to this embodiment will be described below. The electronic control unit 40 performs a variable control on a high pressure side fuel pressure Pm, which is the fuel pressure in the high-pressure fuel pipe 26, through the energization control on the electromagnetic spill valve 35 of the high-pressure fuel pump 24. A pressurizing operation of the high-pressure fuel pump 24 will be described first. In the following description, a movement of the plunger 34 that causes the volume of the pressurizing chamber 30 to shrink regarding the reciprocation of the plunger 34 by the pump-driving cam 33 will be referred to as a rise of the plunger 34 while a movement of the plunger 34 that causes the volume of the pressurizing chamber 30 to expand will be referred to as a fall of the plunger 34.

The fuel that is discharged by the feed pump 21 is introduced into fuel gallery 29 of the high-pressure fuel pump 24 through the low-pressure fuel passage 22. When the plunger 34 falls in a state where the electromagnetic spill valve 35 is open, the fuel is suctioned into the pressurizing chamber 30 from the fuel gallery 29 in response to the expansion of the volume of the pressurizing chamber 30. Then, when the plunger 34 rises after falling, the volume of the pressurizing chamber 30 gradually shrinks. When the electromagnetic spill valve 35 remains open at this time, the fuel is returned from the pressurizing chamber 30 to the fuel gallery 29 in response to the shrinkage of the volume of the pressurizing chamber 30. Once the energization of the electromagnetic spill valve 35 is initiated during the rise of the plunger 34, the electromagnetic spill valve 35 is closed and the pressurizing chamber 30 is sealed. Accordingly, the fuel pressure in the pressurizing chamber 30 rises in response to the shrinkage of the volume of the pressurizing chamber 30. Then, once the fuel pressure in the pressurizing chamber 30 becomes higher than the fuel pressure in the high-pressure fuel pipe 26, the check valve 36 is opened and the fuel in the pressurizing chamber 30 with an increased pressure is pressure-fed to the high-pressure fuel pipe 26. Then, once the energization of the electromagnetic spill valve 35 is stopped when the plunger 34 falls after rising, the fuel is suctioned into the pressurizing chamber 30 from the fuel gallery 29 again in response to the fall of the plunger 34. The high-pressure fuel pump 24 performs the pressurization and discharge of the fuel toward the high-pressure fuel pipe 26 by repeating the suctioning of the fuel during the fall of the plunger 34 described above and the pressurization and discharge of the fuel during the rise of the plunger 34 described above.

The amount of the fuel that is discharged by the high-pressure fuel pump 24 each time a lifting operation of the plunger 34 is performed (hereinafter, referred to as a fuel discharge amount of the high-pressure fuel pump 24) increases when a timing of the initiation of the energization of the electromagnetic spill valve 35 in a period in which the plunger 34 rises is early and decreases when the energization initiation timing is late. The electronic control unit 40 performs a fuel pressure variable control for varying the high pressure side fuel pressure Pm in the high-pressure fuel pipe 26 by adjusting the timing of the initiation of the energization of the electromagnetic spill valve 35.

During the fuel pressure variable control, the electronic control unit 40 first calculates a target fuel pressure Pt, which is a target value of the high pressure side fuel pressure Pm, based on the engine load factor KL and the like. Basically, the target fuel pressure Pt is set to a low pressure when the engine load factor KL is low and to a high pressure when the engine load factor KL is high.

The electronic control unit 40 adjusts the energization initiation timing of the electromagnetic spill valve 35 in the period of the rise of the plunger 34, such that the high pressure side fuel pressure Pm approaches the target fuel pressure Pt, in accordance with a deviation between the high pressure side fuel pressure Pm detected by the fuel pressure sensor 38 and the target fuel pressure Pt. Specifically, when the high pressure side fuel pressure Pm is lower than the target fuel pressure Pt, the electronic control unit 40 puts forward the energization initiation timing of the electromagnetic spill valve 35 and increases the fuel discharge amount of the high-pressure fuel pump 24. When the high pressure side fuel pressure Pm is higher than the target fuel pressure Pt, the electronic control unit 40 puts off the energization initiation timing of the electromagnetic spill valve 35 and decreases the fuel discharge amount of the high-pressure fuel pump 24. In this manner, the electronic control unit 40 feedback-adjusts the fuel discharge amount of the high-pressure fuel pump 24 such that the high pressure side fuel pressure Pm is kept at the target fuel pressure Pt.

Hereinafter, a fuel injection control according to this embodiment will be described. The electronic control unit 40 performs a control of the injection of the fuel by the port injection valves 25 and the in-cylinder injection valves 37. The fuel injection control is performed in the following manner.

During the fuel injection control, the electronic control unit 40 first calculates a required injection quantity Qt based on engine operation situations (such as the engine rotation speed NE and the engine load factor KL). The required injection quantity Qt is a required value of the sum of the fuel injected per combustion cycle in the respective cylinders. The electronic control unit 40 determines an injection distribution ratio for the port injection valve 25 and the in-cylinder injection valve 37 based on the engine operation situations. Then, the electronic control unit 40 allocates the required injection quantity Qt to a port injection quantity Qi and an in-cylinder injection quantity Qd in accordance with the injection distribution ratio. The port injection quantity Qi is the amount of the fuel that is injected by the port injection valves 25. The in-cylinder injection quantity Qd is the amount of the fuel that is injected by the in-cylinder injection valves 37. The electronic control unit 40 calculates each of the energization time of the port injection valve 25 that is required for a fuel injection equivalent to the port injection quantity Qi and the energization time of the in-cylinder injection valve 37 that is required for a fuel injection equivalent to the in-cylinder injection quantity Qd. The electronic control unit 40 performs energization equivalent to the calculated energization times on the port injection valves 25 and the in-cylinder injection valves 37, respectively.

As described above, the high pressure side fuel pressure Pm at which the fuel is supplied to the in-cylinder injection valves 37 is variably controlled. When the high pressure side fuel pressure Pm changes, the amount of the fuel that is injected by the in-cylinder injection valve 37 per unit time in response to energization changes. Accordingly, the electronic control unit 40 calculates the energization time that is required for the fuel injection equivalent to the in-cylinder injection quantity Qd by referring to the high pressure side fuel pressure Pm detected by the fuel pressure sensor 38.

A partial lift injection will be described below. The in-cylinder injection valve 37, which injects the fuel higher in pressure than that injected by the port injection valve 25, injects a larger amount of the fuel than the port injection valve 25 by energization over a shorter period of time. In the in-cylinder injection valve 37, injection quantity accuracy regarding the injection of a small amount of the fuel is significantly affected by the following structure.

Figure 2:
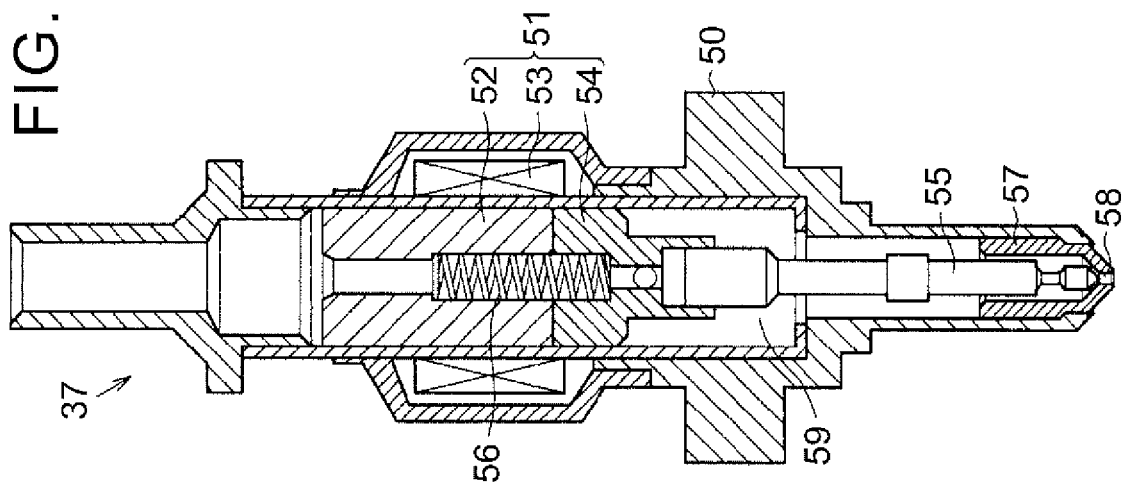
FIG. 2 is a sectional view of an in-cylinder injection valve that is disposed in the fuel system of the engine.

A sectional structure of the in-cylinder injection valve 37 is illustrated in FIG. 2. In the following description, the lower side in the drawing, where the fuel is injected, will be referred to as a tip side of the in-cylinder injection valve 37. As illustrated in FIG. 2, an electromagnetic solenoid 51 is built into a housing 50 of the in-cylinder injection valve 37. The electromagnetic solenoid 51 is provided with a fixed core 52, an electromagnetic coil 53, and a movable core 54. The fixed core 52 is fixed to the housing 50. The electromagnetic coil 53 is disposed around the fixed core 52. The movable core 54 is disposed adjacent to the fixed core 52 on the tip side. In the housing 50, the movable core 54 is installed to be capable of being displaced in the vertical direction of the drawing. A valve body 55 is integrated with the movable core 54 and is connected to the movable core 54 to be capable of displacement. A spring 56 is also disposed in the housing 50 and the spring 56 biases the movable core 54 to the tip side.

A nozzle body 57 is attached to a tip side part of the housing 50 to surround a tip part of the valve body 55. A slit-shaped injection hole 58 is formed at a tip of the nozzle body 57 so that the inside and outside of the nozzle body 57 communicate with each other. A fuel chamber 59, into which the fuel sent from the high-pressure fuel pipe 26 is introduced, is formed in the housing 50.

In the in-cylinder injection valve 37, the valve body 55 is biased to the tip side, along with the movable core 54, by the spring 56. In a state where the energization of the electromagnetic solenoid 51 is not performed, the valve body 55 is displaced to a position where the valve body 55 is seated on the nozzle body 57 (hereinafter, referred to as a fully closed position) due to a biasing force of the spring 56, and then the valve body 55 closes the injection hole 58.

Once the energization of the electromagnetic solenoid 51 is initiated, an electromagnetic suction force is generated between the fixed core 52 and the movable core 54 and the valve body 55 is displaced, along with the movable core 54, to a side closer to the fixed core 52. Once a tip of the valve body 55 leaves the nozzle body 57 as a result, the injection hole 58 is opened and the fuel in the fuel chamber 59 is injected to the outside. The valve body 55 can be displaced to a position where the movable core 54 abuts against the fixed core 52 (hereinafter, referred to as a fully open position) with respect to the side where the tip of the valve body 55 is separated from the nozzle body 57.

Once the energization of the electromagnetic solenoid 51 is stopped, the valve body 55 is displaced toward the fully closed position. Then, once the valve body 55 reaches the fully closed position, the injection hole 58 is closed and the fuel injection is stopped. In the following description, the amount by which the tip of the valve body 55 leaves the nozzle body 57 will be referred to as a nozzle lift amount of the in-cylinder injection valve 37.

Figure 3:
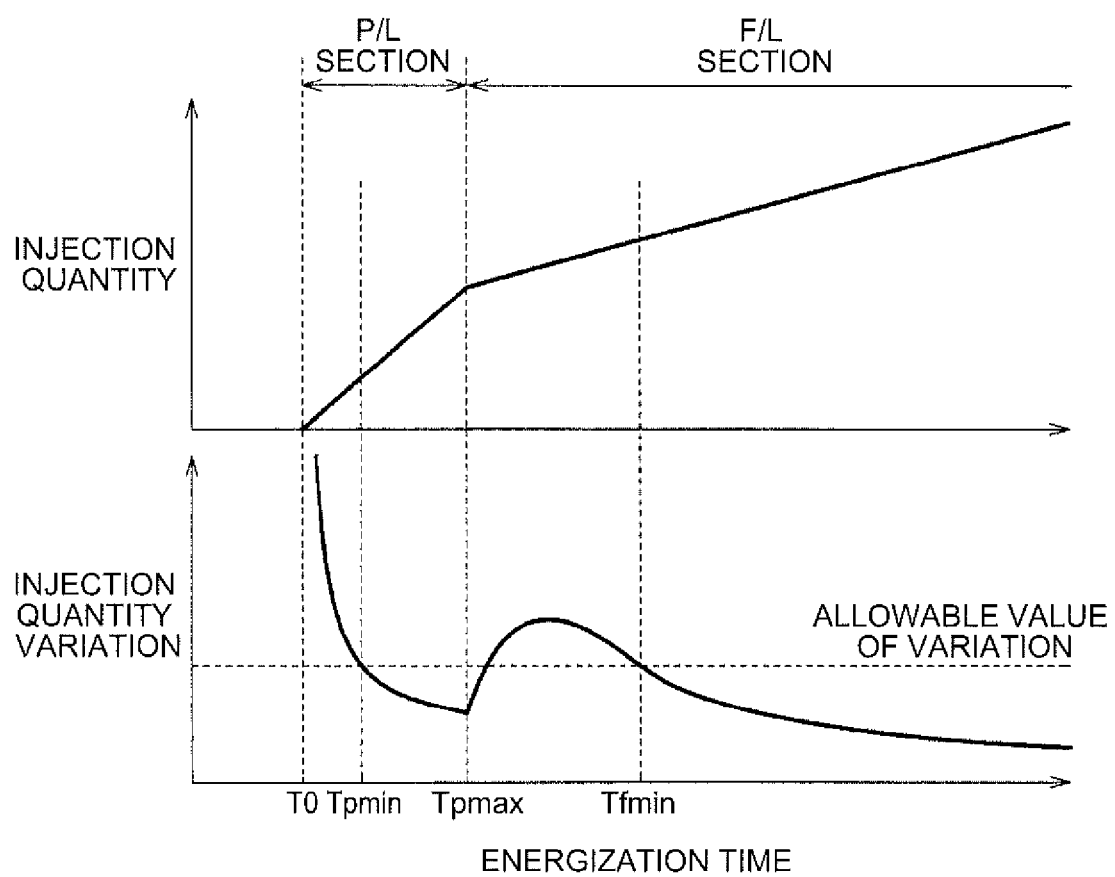
FIG. 3 is a graph illustrating a relationship of an injection quantity of the in-cylinder injection valve and a variation of the injection quantity to an energization time.

A relationship of the injection quantity of the in-cylinder injection valve 37 and a variation of the injection quantity to an energization time with respect to the electromagnetic solenoid 51 is illustrated in FIG. 1. "T0" in FIG. 3 represents an energization time that is required for the initiation of the leaving (lifting) of the valve body 55 from the nozzle body 57 (lift initiation energization time). "Tpmax" in FIG. 3 represents an energization time that is required for the valve body 55 to reach the fully open position (P/L maximum energization time).

In the section of "T0 to Tpmax", the nozzle lift amount changes during energization, and thus the rate of change in the injection quantity of the in-cylinder injection valve 37 with respect to the energization time becomes relatively higher. In the section that is subsequent to "Tpmax", the nozzle lift amount is kept at an amount at a time of a full opening, and thus the rate of change in the injection quantity of the in-cylinder injection valve 37 with respect to the energization time is lower than that in the section of "T0 to Tpmax". In the following description, the section of "T0 to Tpmax" in which the valve body 55 has yet to reach the full opening will be referred to as a partial lift (P/L) section while the section subsequent to the "Tpmax" at which the valve body 55 reaches the full opening will be referred to as a full lift (F/L) section.

A certain degree of variation is present in the length of time until the lifting of the valve body 55 is initiated after the initiation of energization (lift initiation energization time TO), and this variation results in a variation of the injection quantity in the P/L section. Still, the effect of the variation of the lift initiation energization time TO on the injection quantity variation becomes relatively smaller as the injection quantity increases, and thus the variation of the injection quantity in the P/L section decreases as the energization time increases.

Once the valve body 55 where the movable core 54 abuts against the fixed core 52 reaches the fully open position, a bounce motion of the valve body 55 occurs due to a reaction to a collision between the movable core 54 and the fixed core 52. Then, a minute vibration of the nozzle lift amount that is caused by the bounce motion causes the injection quantity variation to increase. The effect that the bounce motion of the valve body 55 at the time of the full opening has on the injection quantity variation becomes relatively smaller as the injection quantity increases. Accordingly, the variation of the injection quantity of the in-cylinder injection valve 37 temporarily increases immediately after the energization time enters the F/L section and then decreases in response to an increase in the energization time. Accordingly, when the fuel injection is performed with the energization time set to at least a predetermined time longer than the P/L maximum energization time Tpmax (F/L minimum energization time Tfmin), the injection quantity variation can be kept at or below an allowable value.

As described above, the injection quantity variation is relatively small, even in the P/L section, during the energization time immediately before the energization time enters the F/L section. Accordingly, the injection quantity variation can be kept at or below the allowable value even when the energization time is set within a range falling short of the P/L maximum energization time Tpmax but equal to or longer than a predetermined time (P/L minimum energization time Tpmin). In this embodiment, the injection of a small amount of the fuel by the in-cylinder injection valve 37 is performed with a high level of injection quantity accuracy by the fuel injection during which the valve body 55 has yet to reach the full opening, which is the so-called partial lift injection, being performed with the energization time set in that range. In contrast to the partial lift injection, the fuel injection during which the valve body 55 reaches the full opening will be referred to as a full lift injection.

The port injection valve 25 has similar structural characteristics. Nonetheless, because the energization time of the port injection valve 25 is longer than the F/L minimum energization time Tfmin of the port injection valve 25 even when the port injection quantity Qi is the lower limit value of the control range, the fuel injection by the port injection valve 25 is performed by the full lift injection, during which the valve body reaches the full opening, without exception.

Hereinafter, a rotation stabilization control during a catalyst rapid warm-up will be described. In this embodiment, the fuel injection control is performed in the following manner during a cold start of the engine 10 for the rapid warm-up of the catalyst device 19. In other words, during the cold start of the engine 10, the fuel equivalent to the required injection quantity Qt is injected by a multi-stage injection (in which fuel is injected from the in-cylinder injection valve 37 a plurality of times in one combustion cycle), which consists of a fuel injection during an intake stroke by the full lift injection of the in-cylinder injection valve 37 and a fuel injection during a compression stroke by the partial lift injection of the in-cylinder injection valve 37, being performed. In this embodiment, the rotation stabilization control for stabilizing the engine rotation speed NE is performed during the catalyst rapid warm-up at a time of the cold start of the engine 10 described above.

Figure 4:
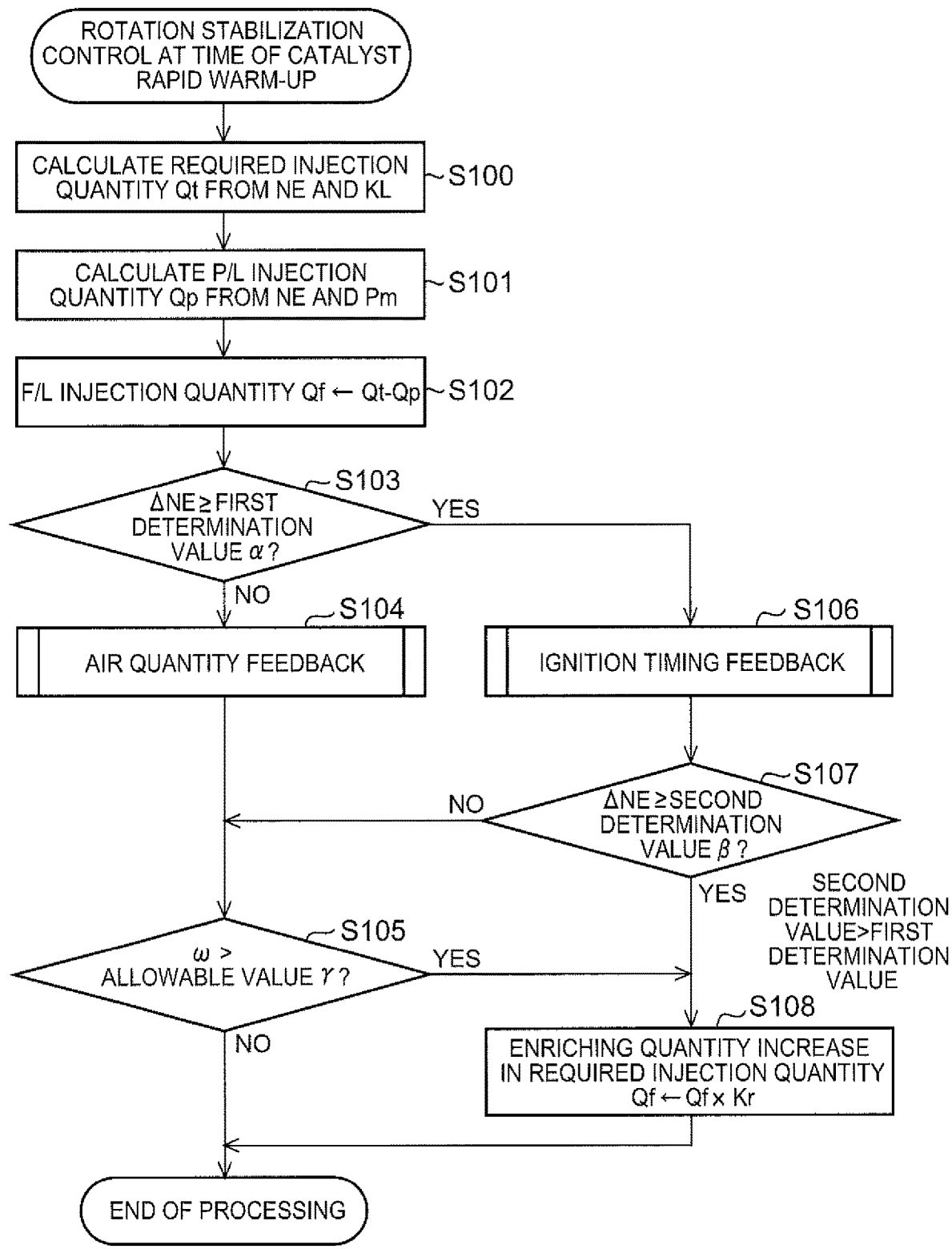
FIG. 4 is a flowchart of a processing routine according to a rotation stabilization control at a time of a catalyst rapid warm-up, which is executed by the control device according to the first embodiment.

A processing routine of the electronic control unit 40 according to the rotation stabilization control during the catalyst rapid warm-up is illustrated in FIG. 4. The processing of the routine that is illustrated in FIG. 4 is repeatedly executed at a predetermined control cycle by the electronic control unit 40 during a warm-up period of the catalyst device 19. In this embodiment, the electronic control unit 40 estimates a catalyst bed temperature of the catalyst device 19 from a cooling water temperature of the engine 10, an integrated value of the fuel injection quantity after a start of the engine 10, and the like. The electronic control unit 40 performs the control with a period until the estimated catalyst bed temperature reaches a predetermined warm-up determination value after the engine 10 is started regarded as the warm-up period of the catalyst device 19.

After the processing of the routine that is illustrated in FIG. 4 is initiated, the required injection quantity Qt is calculated first in Step S100 based on the engine rotation speed NE and the engine load factor KL. The value of the required injection quantity Qt at this time is calculated such that the air-fuel ratio of the air-fuel mixture burned in the cylinder 16 becomes a predetermined target air-fuel ratio.

Then, in Step S101, a P/L injection quantity Qp, which is the injection quantity of the fuel injection by the partial lift injection during the compression stroke regarding the above-described multi-stage injection, is calculated based on the engine rotation speed NE and the high pressure side fuel pressure Pm. Then, in Step S102, a F/L injection quantity Qf, which is the injection quantity of the fuel injection by the full lift injection during the intake stroke regarding the above-described multi-stage injection, is calculated as the value that is obtained by subtracting the P/L injection quantity Qp from the required injection quantity Qt.

Then, in Step S103, it is determined whether or not the decrement ΔNE of the engine rotation speed NE with respect to the target idle rotation speed NT set in advance (=NT−NE) is equal to or greater than a predetermined first determination value α. The difference between the target idle rotation speed NT and an allowable lower limit value NEmin of the engine rotation speed NE at a time of an idle operation (=NT−NEmin) is set to the value of the first determination value α.

The processing proceeds to Step S104 when the decrement ΔNE falls short of the first determination value α

(S103: NO). Then, an air quantity feedback is carried out in Step S104. The air quantity feedback is performed based on a decrement ΔNE of the engine rotation speed NE and by the opening degree of the throttle valve 14 being feedback-adjusted such that the suctioned air amount GA of the engine 10 is increased or decreased for the decrement ΔNE to approach "0". In other words, when the decrement ΔNE is a negative value, that is, when the engine rotation speed NE exceeds a target idle rotation speed NT, the opening degree of the throttle valve 14 is gradually reduced such that the suctioned air amount GA is reduced. When the decrement ΔNE is a positive value, that is, when the engine rotation speed NE falls short of the target idle rotation speed NT, the opening degree of the throttle valve 14 is gradually increased such that the suctioned air amount GA increases. A predetermined maximum idle air quantity GAmax is set as the upper limit value of the suctioned air amount GA for the air quantity feedback. In other words, an increase in the suctioned air amount GA during the air quantity feedback is limited once the suctioned air amount GA reaches the maximum idle air quantity GAmax.

In Step S105, it is determined whether or not a variation amount co of the engine rotation speed NE exceeds a predetermined allowable value γ. In this embodiment, the variation amount co of the engine rotation speed NE is obtained in the following manner. In other words, the electronic control unit 40 measures a time that is required for a crankshaft rotation equivalent to a predetermined crank angle at a constant cycle. The electronic control unit 40 obtains, as the variation amount ω of the engine rotation speed NE, the difference between the time that is currently measured and a gradual change value of the time that was previously measured.

The current processing of this routine is terminated as it is when the variation amount ω is equal to or less than the allowable value γ (S105: NO). In contrast, when the variation amount co exceeds the allowable value γ (S105: YES), the processing proceeds to Step S108, and then the current processing of this routine is terminated after a correction for increasing the required injection quantity Qt, which is to enrich the air-fuel ratio, is performed in Step S108. Details of the processing relating to the correction for increasing the required injection quantity Qt at this time will be described in detail later.

When the decrement ΔNE is equal to or greater than the first determination value α (S103: YES), the processing proceeds to Step S106 and an ignition timing feedback is performed in Step S106. During the ignition timing feedback, a timing of the ignition by the ignition plug S is feedback-adjusted such that the decrement ΔNE of the engine rotation speed NE falls short of the first determination value α. Specifically, the ignition timing is gradually advanced in a case where the decrement ΔNE of the engine rotation speed NE is equal to or greater than the first determination value α.

Then, in Step S107, it is determined whether or not the decrement ΔNE of the engine rotation speed NE is equal to or greater than a predetermined second determination value β. A value that exceeds the first determination value α is set to the second determination value β. The processing proceeds to Step S105 described above when the decrement ΔNE falls short of the second determination value β (S107: NO). In this case, the current processing is terminated as it is if it is determined in Step S105 that the variation amount ω of the engine rotation speed NE is equal to or less than the allowable value γ and an enriching quantity increase in the required injection quantity Qt is performed in Step S108 if it is determined that the variation amount ω exceeds the allowable value γ.

The processing proceeds to Step S108 as it is when the decrement ΔNE is equal to or greater than the second determination value β (S107: YES). In other words, in this case, the enriching quantity increase in the required injection quantity Qt is performed regardless of the magnitude of the variation amount ω of the engine rotation speed NE.

The correction for increasing the required injection quantity Qt in Step S108 of this routine, which is to enrich the air-fuel ratio, is performed in the following manner. In the following description, a time when the correction for increasing the required injection quantity Qt is not performed will be referred to as a base time and a time when the correction for increasing the required injection quantity Qt is performed will be referred to as a time of the enriching quantity increase.

In other words, at the time of the enriching quantity increase, the value of the F/L injection quantity Qf is updated to the value that is obtained by the value calculated in Step S102 being multiplied by a predetermined quantity-increase coefficient Kr. The P/L injection quantity Qp is kept at the value calculated in Step S101. Accordingly, even at the time of the enriching quantity increase, the injection timings of the fuel injection during the intake stroke by the full lift injection and the fuel injection during the compression stroke by the partial lift injection (injection initiation timings) are maintained at the same timing as in the base time.

Figure 5:
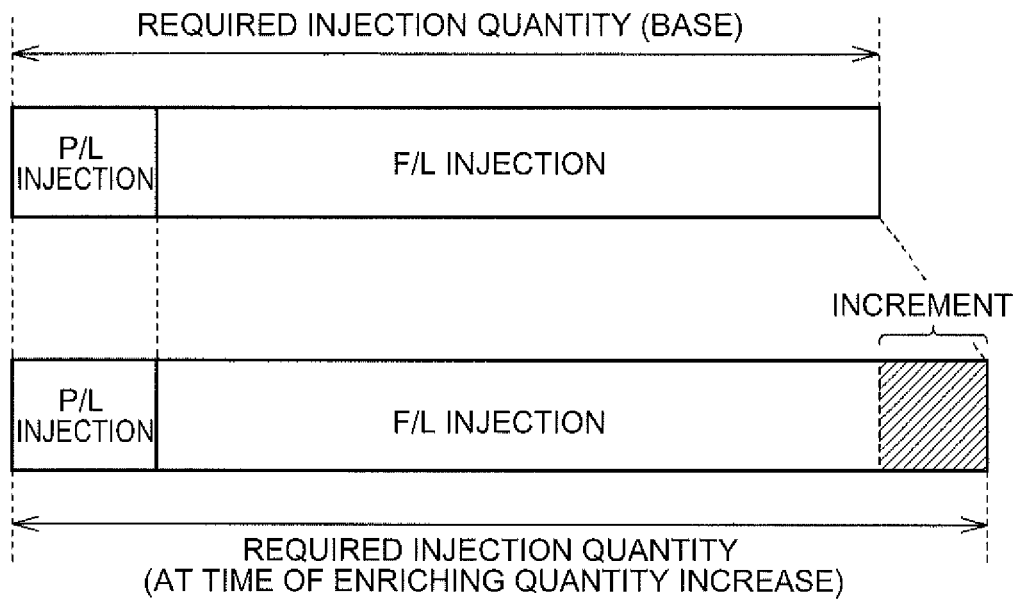
FIG. 5 is a drawing illustrating the allocation of the injection quantities of respective injections at a base time and at a time of an enriching quantity increase in the control device according to the first embodiment.

As illustrated in FIG. 5, the correction for increasing the required injection quantity Qt at the time of the enriching quantity increase is performed by only the injection quantity of the fuel injection by the full lift injection (F/L injection) during the intake stroke (F/L injection quantity Qf) being increased out of the multi-stage injection that is carried out for the catalyst rapid warm-up. Accordingly, at the time of the enriching quantity increase, the sum of the injection quantities of the multi-stage injection is increased by the amount of an amount-increasing correction due to the enriching quantity increase without the injection quantity (P/L injection quantity Qp) and injection timing of the fuel injection by the partial lift injection (P/L injection) being changed from the base time.

Hereinafter, an effect of the engine control device according to this embodiment described above will be described. At the time of the cold start of the engine 10, a cylinder wall surface has a low temperature and the cylinder wall surface has an increasing fuel adhesion amount, and thus the ignition of the air-fuel mixture by the ignition plug S might become difficult with the air-fuel ratio becoming lean. As a result, a combustion state deteriorates, the temperature of the exhaust gas is reduced, and the warm-up of the catalyst device 19 is delayed in some cases. In the engine control device according to this embodiment, the deterioration of the combustion state is suppressed and the warm-up of the catalyst device 19 is promoted by the multi-stage injection consisting of the fuel injection by the full lift injection during the intake stroke and the fuel injection by the partial lift injection during the compression stroke being performed at the time of the cold start of the engine 10.

Figure 6:
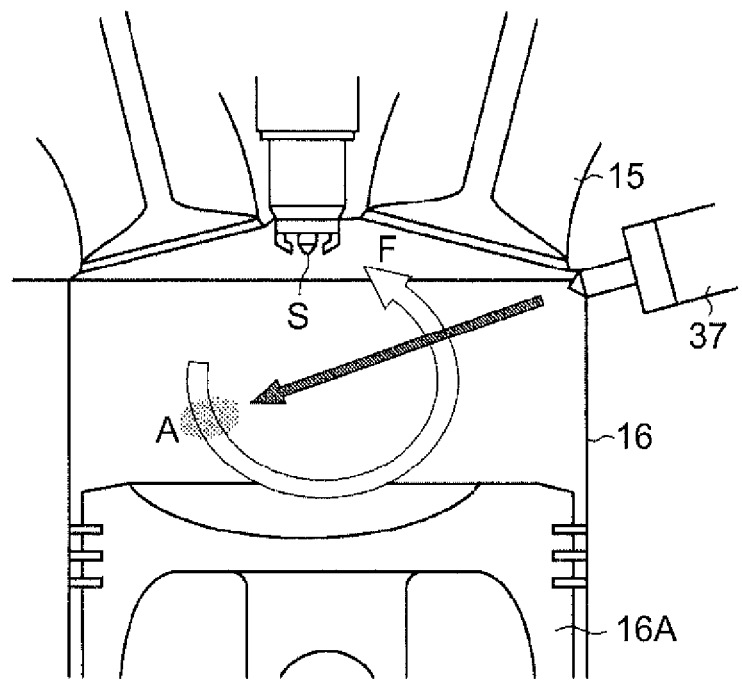
FIG. 6 is a drawing illustrating how fuel spray is formed in a cylinder when a partial lift injection is performed at an injection quantity set from the beginning.

As illustrated in FIG. 6, the fuel injection by the partial lift injection during the compression stroke at this time is performed with the injection quantity and injection timing of the fuel injection set such that spray A of the injected fuel is put on an in-cylinder air flow F formed in the cylinder 16 in the compression stroke and is collected in the vicinity of the ignition plug S. Once this partial lift injection is performed, an increase in fuel adhesion occurs and a sufficiently thick air-fuel mixture is present at a part in the vicinity of the ignition plug S although the air-fuel ratio of the air-fuel mixture is lean in the cylinder 16 as a whole. Accordingly, the ignition of the air-fuel mixture can be appropriately performed and the deterioration of the combustion state is suppressed, and thus the decline in the exhaust gas temperature is suppressed and the warm-up of the catalyst device 19 is promoted.

In the engine control device according to this embodiment, the rotation stabilization control for keeping the engine rotation speed NE at the target idle rotation speed NT is performed at a time of the catalyst rapid warm-up. During the rotation stabilization control, the engine rotation speed NE is adjusted to be kept at the target idle rotation speed NT while the air quantity feedback, the ignition timing feedback, and the enriching correction of the required injection quantity Qt are properly employed in accordance with the decrement ΔNE of the engine rotation speed NE with respect to the target idle rotation speed NT and the variation amount ω of the engine rotation speed NE.

Specifically, the engine rotation speed NE is adjusted by the air quantity feedback alone in a case where the engine rotation speed NE is relatively stable with the decrement ΔNE falling short of the first determination value α and the variation amount ω being equal to or less than the allowable value γ. When the engine rotation speed NE at this time falls short of the target idle rotation speed NT, the suctioned air amount GA is increased by the air quantity feedback and the required injection quantity Qt is increased along with the increase in the suctioned air amount GA. Accordingly, the torque that is generated by the engine 10 increases and the engine rotation speed NE is raised. When the engine rotation speed NE exceeds the target idle rotation speed NT, the suctioned air amount GA is reduced by the air quantity feedback and the required injection quantity Qt is reduced along with the reduction in the suctioned air amount GA. Accordingly, the torque that is generated by the engine 10 decreases and the engine rotation speed NE falls.

In a case where the engine rotation speed NE is significantly reduced, the suctioned air amount GA reaches the maximum idle air quantity GAmax and a further increase in the engine rotation speed NE by the air quantity feedback becomes impossible in some cases. In this case, an engine stall might be caused with the air quantity feedback alone that requires a certain period of time for the reflection of a feedback result in the engine rotation speed NE because of an intake air transport delay. In this regard, in a case where the decrement ΔNE is equal to or greater than the first determination value α, the engine rotation speed NE is adjusted by performing the ignition timing feedback.

In a case where a large amount of the fuel adheres to the cylinder wall surface, the ignition might be performed inappropriately and a misfire might occur even if the multi-stage injection including the partial lift injection during the compression stroke described above is performed. Even if the misfire does not occur, the flame propagation subsequent to the ignition might slow down and the combustion might slow down. When this deterioration of the combustion state intermittently occurs, the variation amount w of the engine rotation speed NE increases. In this regard, in this embodiment, the enriching quantity increase in the required injection quantity Qt is performed when the variation amount ω exceeds the allowable value γ in a case where the decrement ΔNE of the engine rotation speed NE falls short of the second determination value β. Once the enriching quantity increase is performed, the required injection quantity Qt is increased by more than the amount that is required for the air-fuel ratio to be the target air-fuel ratio, and the air-fuel ratio becomes rich. Accordingly, the deterioration of the combustion state that is due to a lean air-fuel ratio can be suppressed.

In a case where the engine rotation speed NE has been significantly reduced to the point of the decrement ΔNE becoming equal to or greater than the second determination value β, the deterioration of the combustion state has become a norm and the value of the variation amount ω might not be increased despite the deterioration of the combustion state. In this regard, in a case where the decrement ΔNE is equal to or greater than the second determination value β, the correction for increasing the required injection quantity Qt for enriching the air-fuel ratio is performed regardless of the magnitude of the variation amount ω.

In this embodiment, the correction for increasing the required injection quantity Qt is performed when the multi-stage injection consisting of the fuel injection by the full lift injection during the intake stroke and the fuel injection by the partial lift injection during the compression stroke is carried out. A case where both the F/L injection quantity Qf and the P/L injection quantity Qp are increased during the amount-increasing correction at this time will be described below.

As described above, the injection quantity of the in-cylinder injection valve 37 is controlled by the energization time, and the energization time of the in-cylinder injection valve 37 increases as the injection quantity increases. In the partial lift section, the lift amount of the valve body 55 increases in accordance with the energization time, and the fuel injection pressure increases along with the increase in the lift amount. Accordingly, the penetration force of the injected fuel increases when the P/L injection quantity Qp is increased.

Figure 7:
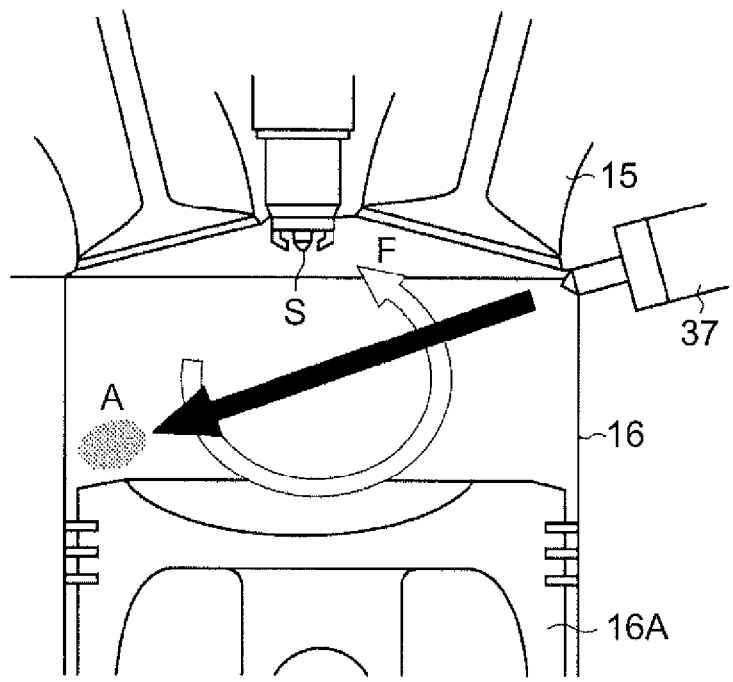
FIG. 7 is a drawing illustrating how the fuel spray is formed in the cylinder when the partial lift injection is performed at an injection quantity corrected to be increased.

As illustrated in FIG. 7, the reach of the spray A extends when the penetration force of the fuel injected by the partial lift injection during the compression stroke increases. Then, the spray A falls out of the in-cylinder air flow F. Accordingly, the fuel injected by the partial lift injection during the compression stroke becomes difficult to be collected in the vicinity of the ignition plug S, and it becomes difficult to improve the combustion state. In this point, in this embodiment, the injection quantity (P/L injection quantity Qp) and injection timing of the fuel injection by the partial lift injection during the compression stroke are not changed from the base time even at the time of the enriching quantity increase in the required injection quantity Qt, and thus the effect of combustion improvement by the partial lift injection is maintained.

The following effects can be achieved by the engine control device according to this embodiment described above.

(1) At the time of the correction for increasing the required injection quantity Qt for enriching the air-fuel ratio, the sum of the injection quantities of the full lift injection and the partial lift injection is increased by the amount of the amount-increasing correction without the injection quantity (P/L injection quantity Qp) and injection timing of the fuel injection by the partial lift injection during the compression stroke being changed. Accordingly, the effect of the combustion improvement by the partial lift injection during the compression stroke can be maintained even at the time of the correction for increasing the required injection quantity Qt.

(2) The air-fuel ratio can be enriched with the effect of the combustion improvement by the partial lift injection being maintained. Accordingly, the deterioration of the combustion state can be more effectively suppressed by both the partial lift injection and the enrichment of the air-fuel ratio.

(3) When the engine rotation speed NE is reduced to the point of the decrement ΔNE with respect to the target idle rotation speed NT becoming equal to or greater than the first determination value α, the ignition timing feedback is performed. Accordingly, a recovery of the engine rotation speed NE to the target idle rotation speed NT can be performed more quickly and reliably. A change in the ignition timing causes an exhaust gas property to deteriorate in some cases. Accordingly, in a case where the engine rotation speed NE has a small decrement, the deterioration of the exhaust gas property can be suppressed by the ignition timing feedback not being performed.

(4) When the combustion state deteriorates and the variation amount ω of the engine rotation speed NE exceeds the allowable value γ, the air-fuel ratio is enriched by the required injection quantity Qt being subjected to the amount-increasing correction. Accordingly, the deterioration of the combustion state can be suppressed and the engine rotation speed NE can be stabilized.

(5) When the engine rotation speed NE is reduced to the point of the decrement ΔNE with respect to the target idle rotation speed NT becoming equal to or greater than the second determination value β, the air-fuel ratio is enriched by the required injection quantity Qt being subjected to the amount-increasing correction regardless of the magnitude of the variation amount ω. Accordingly, the correction for increasing the required injection quantity Qt for enriching the air-fuel ratio is reliably carried out even in a case where the deterioration of the combustion state has become a norm.

Hereinafter, a second embodiment of the engine control device will be described in detail with reference to the drawings including FIG. 8. In this embodiment, the same reference numerals will be used to refer to configurations common to the first and second embodiments and detailed description thereof will be omitted.

Figure 8:
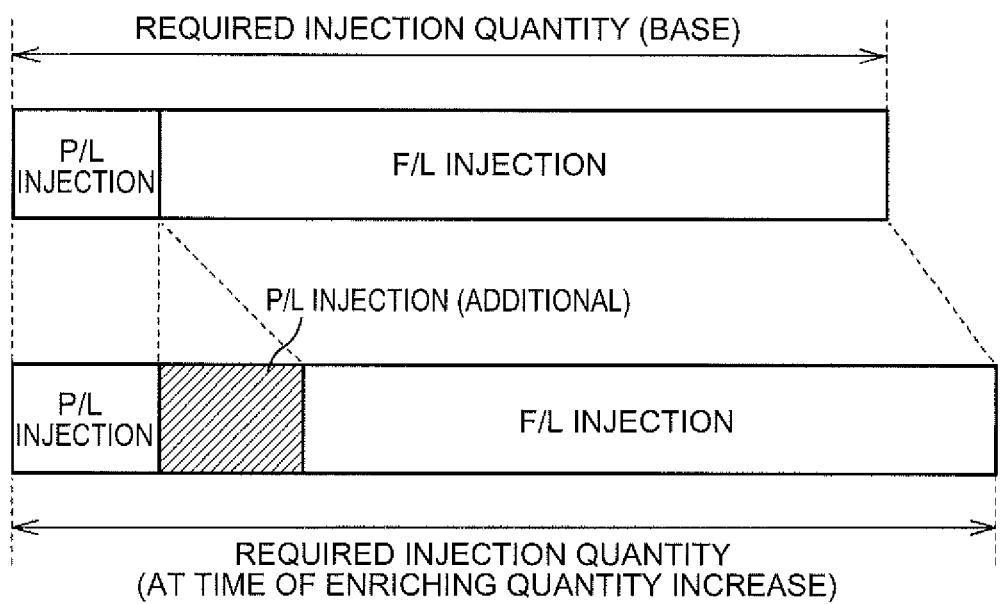
FIG. 8 is a drawing illustrating the allocation of the injection quantities of respective injections at a base time and at a time of an enriching quantity increase in an engine control device according to a second embodiment.

In this embodiment, the number of the partial lift injections (P/L injections) is increased with respect to the base time at the time of the enriching quantity increase as illustrated in FIG. 8. In other words, in this embodiment, the sum of the injection quantities of the multi-stage injection is increased by the amount of the amount-increasing correction by an additional fuel injection by the partial lift injection being added apart from the fuel injection by the partial lift injection included in the multi-stage injection from the base time. In the following description, the fuel injection by the partial lift injection included in the multi-stage injection from the base time will be referred to as the fuel injection by a base-equivalent partial lift injection.

In this embodiment, the fuel injection by the extra partial lift injection is performed at a timing during the compression stroke after the fuel injection by the base-equivalent partial lift injection is carried out. The injection quantities of the respective partial lift injections at this time are set in the following manner. Firstly, the value of the required injection quantity Qt is updated to the value that is obtained by the value calculated based on the engine rotation speed NE and the engine load factor KL being multiplied by the quantity-increase coefficient Kr. Then, both of the injection quantities of the base-equivalent partial lift injection and the extra partial lift injection are calculated. Herein the injection quantity of the extra partial lift injection is equal to the injection quantity of the base-equivalent partial lift injection. Then, the value that is obtained by the total of the injection quantities of both of the partial lift injections being subtracted from the updated required injection quantity Qt is set as the value of the F/L injection quantity Qf.

Even in the engine control device according to this embodiment, the sum of the injection quantities of the multi-stage injection can be increased by the amount of the amount-increasing correction, without the injection quantity and injection timing of the fuel injection by the partial lift injection during the compression stroke being changed, at the time of the correction for increasing the required injection quantity Qt for enriching the air-fuel ratio. Accordingly, the engine control device according to this embodiment can achieve effects similar to those achieved by that according to the first embodiment.

Hereinafter, a third embodiment of the engine control device will be described in detail with reference to the drawings including FIG. 9. In this embodiment, the same reference numerals will be used to refer to configurations common to the first, second, and third embodiments and detailed description thereof will be omitted.

In each of the above-described embodiments, the fuel injection at the time of the catalyst rapid warm-up in the engine 10 is performed through the multi-stage injection consisting of the fuel injection by the full lift injection that is carried out during the intake stroke by the in-cylinder injection valve 37 and the fuel injection by the partial lift injection that is carried out during the compression stroke by the in-cylinder injection valve 37. In this embodiment, the fuel injection at the time of the catalyst rapid warm-up in the engine 10 is performed through a multi-stage injection consisting of a fuel injection during the intake stroke that is carried out by the port injection valve 25 (port injection) and the fuel injection during the compression stroke that is carried out by the in-cylinder injection valve 37. The port injection at this time is carried out by the full lift injection by the port injection valve 25.

In this embodiment, the rotation stabilization control is performed as in the above-described embodiments. However, an increase in the required injection quantity Qt for the enrichment of the air-fuel ratio according to this embodiment is performed in the following manner.

Figure 9:
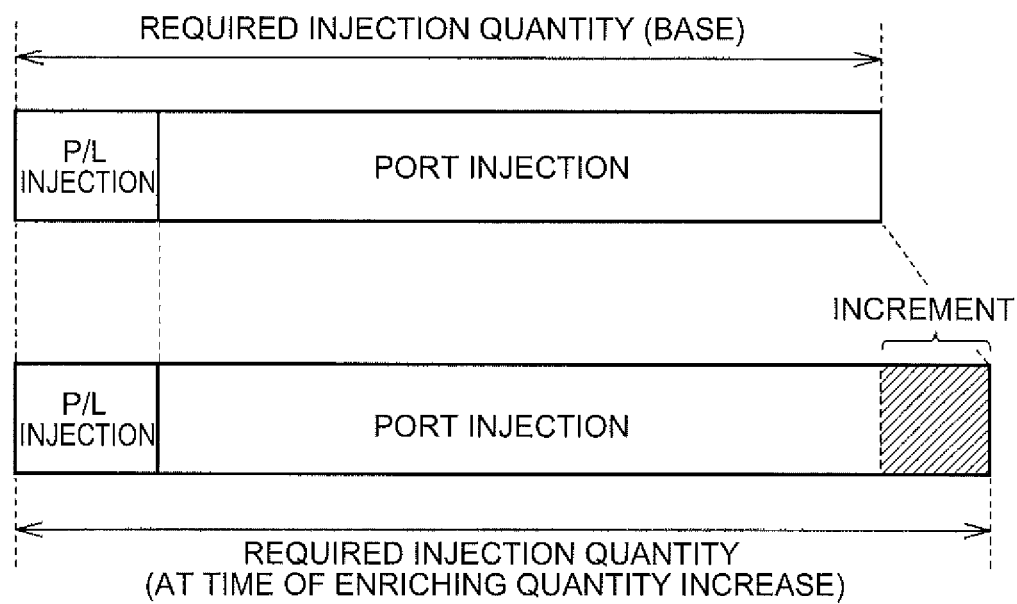
FIG. 9 is a drawing illustrating the allocation of the injection quantities of respective injections at a base time and at a time of an enriching quantity increase in an engine control device according to a third embodiment.

As illustrated in FIG. 9, in this embodiment, the injection quantity of the port injection (port injection quantity Qi) is increased with respect to the base time by the amount of the correction for increasing the required injection quantity Qt for enriching the air-fuel ratio at the time of the enriching quantity increase. Even at the time of the enriching quantity increase, the injection quantity and injection timing of the fuel injection by the partial lift injection (P/L injection) are kept at the same quantity and timing as in the base time. Accordingly, even in this embodiment, the sum of the injection quantities of the multi-stage injection is increased by the amount of the amount-increasing correction, without the injection quantity and injection timing of the fuel injection by the partial lift injection during the compression stroke being changed from the base time, at the time of the enriching quantity increase. Accordingly, the engine control device according to this embodiment can achieve effects similar to those achieved by that according to the first embodiment.

In this embodiment, the calculation of the port injection quantity Qi in the multi-stage injection at the time of the catalyst rapid warm-up is performed in the same manner as the calculation of the F/L injection quantity Qf in the multi-stage injection according to the first embodiment. In other words, the port injection quantity Qi in the base time is calculated by the P/L injection quantity Qp being subtracted from the required injection quantity Qt after the calculation of the required injection quantity Qt and the P/L injection quantity Qp. At the time of the enriching quantity increase, the port injection quantity Qi is calculated by the above-described calculated value being multiplied by the quantity-increase coefficient Kr.

The embodiments described above can be put into practice after being modified as follows. The calculation of the F/L injection quantity Qf according to the first embodiment and the calculation of the port injection quantity Qi according to the third embodiment at the time of the enriching quantity increase may be performed as follows. The required injection quantity Qt is calculated first from the engine rotation speed NE and the engine load factor KL, and then the value of the required injection quantity Qt is updated to the value that is obtained by the calculated value being multiplied by the quantity-increase coefficient Kr. Then, after the calculation of the P/L injection quantity Qp, the value that is obtained by the P/L injection quantity Qp being subtracted from the updated value of the required injection quantity Qt is set to the value of the F/L injection quantity Qf or the port injection quantity Qi. Even in this case, the sum of the injection quantities of the multi-stage injection can be increased at the time of the enriching quantity increase without the injection quantity and injection timing of the partial lift injection being changed from the base time.

The extra partial lift injection according to the second embodiment may be performed at any timing other than that described above insofar as the other injections are not inhibited at that timing. For example, the extra partial lift injection according to the second embodiment may be performed at a timing during the compression stroke before the fuel injection by the partial lift injection included in the multi-stage injection from the beginning is carried out or may be performed during the intake stroke.

In the second embodiment, the injection quantity of the extra partial lift injection is equal to the injection quantity of the base-equivalent partial lift injection. However, the injection quantity of the extra partial lift injection may differ from the injection quantity of the base-equivalent partial lift injection. In the second embodiment, the number of the fuel injections by the partial lift injection is increased from once as in the base time to twice at the time of the enriching quantity increase. In a case where a required quantity increase by the amount of the amount-increasing correction is not satisfied with the increase in the number of the fuel injections alone, the number of the fuel injections by the partial lift injection at the time of the enriching quantity increase may be increased to at least three times.

In the embodiments described above, the fuel injection by the full lift injection of the in-cylinder injection valve 37 or the port injection valve 25 in the multi-stage injection at the time of the catalyst rapid warm-up is performed only once. However, the fuel injection by the full lift injection may be performed on a plurality of divided occasions.

In each of the embodiments described above, the fuel injection equivalent to the required injection quantity Qt is performed at the time of the catalyst rapid warm-up through the multi-stage injection including the fuel injection by the partial lift injection. Then, the correction for increasing the required injection quantity Qt is performed when the deterioration of the combustion state is confirmed. However, the correction for increasing the required injection quantity Qt may be performed even when the deterioration of the combustion state is not confirmed, examples of which include an amount-increasing correction in accordance with the temperature of a catalyst for protecting the catalyst from overheating, an amount-increasing correction for increasing an engine output during acceleration or the like, an amount-increasing correction in accordance with the cooling water temperature for promoting the warm-up of the engine 10, and an amount-increasing correction in accordance with the retarding of the ignition timing. Even in such cases, the effect of the combustion improvement by the partial lift injection can be maintained despite the amount-increasing correction insofar as the sum of the injection quantities of the multi-stage injection is increased by the amount of the amount-increasing correction without the injection quantity and injection timing of the fuel injection by the partial lift injection being changed.

In each of the embodiments described above, the multi-stage injection including the fuel injection by the partial lift injection is performed so that the combustion state is improved during the catalyst rapid warm-up. It is also conceivable that the multi-stage injection including the fuel injection by the partial lift injection is performed for a different purpose. Even in this case, the injection of a small amount of the fuel that is realized by the partial lift injection is used in a situation in which a precise injection control is required, and slight changes in the injection quantity and injection timing significantly affect the combustion in the engine and the exhaust gas property in that situation. Accordingly, even in that case, the sum of the injection quantities of the multi-stage injection may be increased by the amount of the amount-increasing correction, without the injection quantity and injection timing of the fuel injection by the partial lift injection being changed, when the required injection quantity Qt is subjected to the amount-increasing correction while the multi-stage injection including the fuel injection by the partial lift injection is carried out. In that case, the effect of the partial lift injection can be maintained even at the time of the amount-increasing correction.

What is claimed is:

1. A control device for an engine, the engine including a fuel injection valve having a valve body, the control device comprising an electronic control unit configured to:
calculate a required injection quantity in accordance with an operation state of the engine so that an air-fuel ratio of an air-fuel mixture burned in a cylinder of the engine becomes a predetermined target air-fuel ratio, the operation state of the engine including a rotation speed of the engine and an engine load value;
control the fuel injection valve such that the required injection quantity of a fuel is injected by the fuel injection valve; and
when performing (1) a multi-stage injection in which the required injection quantity of the fuel is injected by the fuel injection valve by performing a plurality of injections in one combustion cycle of the engine, the plurality of injections including (a) a partial-lift injection in which injection of a first portion of the required injection quantity at a first timing is completed before the valve body reaches a fully-open position during a compression stroke of the one combustion cycle, and (b) a full-lift injection in which injection of a remaining portion of the required injection quantity is completed after the valve body reaches the fully-open position during an intake stroke of the one combustion cycle, and (2) an amount increasing correction to increase the injection quantity above the required injection quantity so that an increased injection quantity of the fuel is injected during the multi-stage injection to enrich the air-fuel ratio relative to the predetermined target air-fuel ratio, only the injection quantity of the full-lift injection is increased while the injection quantity of the first portion and the injection timing at the first timing of the partial-lift injection are maintained, wherein the amount increasing correction is performed based on at least one of: (i) a confirmation of a deterioration of a combustion state of the engine, (ii) a temperature of a catalyst that receives an exhaust gas of the engine, (iii) a temperature of a cooling water of the engine, and (iv) a retarding of an ignition timing of the engine, and wherein the electronic control unit is configured to perform the multi-stage injection during an idle operation during a cold start of the engine.

2. The control device according to claim 1, wherein the electronic control unit is configured to perform the amount-increasing correction on the required injection quantity when the deterioration of the combustion state of the engine is confirmed.

3. A control method for an engine, the engine including a fuel injection valve having a valve body, the control method comprising:

calculating a required injection quantity in accordance with an operation state of the engine so that an air-fuel ratio of an air-fuel mixture burned in a cylinder of the engine becomes a predetermined target air-fuel ratio, the operation state of the engine including a rotation speed of the engine and an engine load value;

controlling the fuel injection valve such that the fuel injection valve injects the required injection quantity of a fuel; and when (1) performing a multi-stage injection in which the required injection quantity of the fuel is injected by the fuel injection valve by performing a plurality of injections in one combustion cycle of the engine, the plurality of injections including (a) a partial-lift injection in which injection of a first portion of the required injection quantity at a first timing is completed before the valve body reaches a fully-open position during a compression stroke of the one combustion cycle, and (b) a full-lift injection in which injection of a remaining portion of the required injection quantity is completed after the valve body reaches the fully-open position during an intake stroke of the one combustion cycle, and (2) increasing the injection quantity above the required injection quantity due to an amount-increasing correction so that an increased injection quantity of the fuel is injected during the multi-stage injection to enrich the air-fuel ratio relative to the predetermined target air-fuel ratio, the increasing is achieved by either:

(A) increasing only the injection quantity of the full-lift injection while the injection quantity of the first portion and the injection timing at the first timing of the partial-lift injection are maintained, or (B) performing an additional partial-lift injection that is separate from the partial-lift injection of the first portion at the first timing while maintaining the partial-lift injection of the first portion at the first timing, wherein the amount increasing correction is performed based on at least one of: (i) a confirmation of a deterioration of a combustion state of the engine, (ii) a temperature of a catalyst that receives an exhaust gas of the engine, (iii) a temperature of a cooling water of the engine, and (iv) a retarding of an ignition timing of the engine, and wherein the electronic control unit is configured to perform the multi-stage injection during an idle operation during a cold start of the engine.

4. A control device for an engine, the engine including a fuel injection valve having a valve body, the control device comprising an electronic control unit configured to:

calculate a required injection quantity in accordance with an operation state of the engine so that an air-fuel ratio of an air-fuel mixture burned in a cylinder of the engine becomes a predetermined target air-fuel ratio, the operation state of the engine including a rotation speed of the engine and an engine load value;

control the fuel injection valve such that the required injection quantity of a fuel is injected by the fuel injection valve; and when performing (1) a multi-stage injection in which the required injection quantity of the fuel is injected by the fuel injection valve by performing a plurality of injections in one combustion cycle of the engine, the plurality of injections including (a) a partial-lift injection in which injection of a first portion of the required injection quantity at a first timing is completed before the valve body reaches a fully-open position during a compression stroke of the one combustion cycle, and (b) a full-lift injection in which injection of a remaining portion of the required injection quantity is completed after the valve body reaches the fully-open position during an intake stroke of the one combustion cycle, and (2) an amount increasing correction to increase the injection quantity above the required injection quantity so that an increased injection quantity of the fuel is injected during the multi-stage injection to enrich the air-fuel ratio relative to the predetermined target air-fuel ratio, the amount increasing correction is achieved by performing an additional partial-lift injection that is separate from the partial-lift injection of the first portion at the first timing while maintaining the partial-lift injection of the first portion at the first timing, wherein the amount increasing correction is performed based on at least one of: (i) a confirmation of a deterioration of a combustion state of the engine, (ii) a temperature of a catalyst that receives an exhaust gas of the engine, (iii) a temperature of a cooling water of the engine, and (iv) a retarding of an ignition timing of the engine, and wherein the electronic control unit is configured to perform the multi-stage injection during an idle operation during a cold start of the engine.

5. The control device according to claim 4, wherein the electronic control unit is configured to perform the amount-increasing correction on the required injection quantity when the deterioration of the combustion state of the engine is confirmed.

6. The control device according to claim 1, wherein the amount increasing correction is performed when the deterioration of the combustion state of the engine is confirmed based on a comparison between the rotation speed of the engine that was used to calculate the required injection quantity and a target idle rotation speed.

7. The control method according to claim 3, wherein the amount increasing correction is performed when the deterioration of the combustion state of the engine is confirmed based on a comparison between the rotation speed of the engine that was used to calculate the required injection quantity and a target idle rotation speed.

8. The control device according to claim 4, wherein the amount increasing correction is performed when the deterioration of the combustion state of the engine is confirmed based on a comparison between the rotation speed of the engine that was used to calculate the required injection quantity and a target idle rotation speed.

\* \* \* \* \*